(12) United States Patent
Contreras et al.

(10) Patent No.: US 6,181,527 B1
(45) Date of Patent: Jan. 30, 2001

(54) TRANSDUCER SUSPENSION SYSTEM INCLUDING A FREQUENCY DEPENDENT SHUNT

(75) Inventors: John Thomas Contreras; Klaas Bevend Klaassen; Darrell Dean Palmer, all of San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/298,632

(22) Filed: Apr. 23, 1999

(51) Int. Cl.[7] .......................................................... G11B 5/48
(52) U.S. Cl. .......................................... 360/246; 360/244.7
(58) Field of Search ............................... 360/244.7, 245.8, 360/245.9, 246

(56) References Cited

U.S. PATENT DOCUMENTS

| | | | |
|---|---|---|---|
| 5,608,591 | * 3/1997 | Klaasen | 360/245.9 |
| 5,657,186 | 8/1997 | Kudo et al. | 360/104 |
| 5,666,717 | 9/1997 | Matsumoto et al. | 29/603.12 |
| 5,673,484 | 10/1997 | Masaichi et al. | 29/896.93 |
| 5,717,547 | * 2/1998 | Young | 360/245.9 |
| 5,781,379 | 7/1998 | Erpelding et al. | 360/104 |
| 5,844,753 | 12/1998 | Inaba | 360/104 |
| 5,854,724 | 12/1998 | Inaba et al. | 360/104 |
| 5,857,257 | 1/1999 | Inaba | 29/603.04 |
| 5,877,919 | * 3/1999 | Foisy et al. | 360/244.6 |
| 5,930,072 | * 7/1999 | Shrinkle | 360/97.01 |
| 5,995,329 | * 11/1999 | Shiraishi et al. | 360/245.9 |

* cited by examiner

*Primary Examiner*—Jefferson Evans
(74) *Attorney, Agent, or Firm*—Douglas R. Millett

(57) ABSTRACT

A transducer suspension system comprises an actuator arm and a suspension. The suspension is comprised of a load beam and a laminated member. The laminated member has an electrically conducting layer and electrical insulating layer, and an electrically conductive support layer. The electrical conducting layer is formed into electrical lines. The support layer is formed into a continuous underlying conductive plane. The conductive plane is connected to the arm by means of a frequency dependent shunt. The combination of the conductive plane and the shunt provide for higher frequency performance with reduced interference susceptibility.

8 Claims, 5 Drawing Sheets

TRANSDUCER SUSPENSION SYSTEM INCLUDING A FREQUENCY DEPENDENT SHUNT

BACKGROUND OF THE INVENTION

1. Field of the Invention

This invention relates generally to transducer suspension systems and more particularly to a suspension system with integral electrical leads.

2. Description of Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some proposed disk drives, the slider (or carrier) rides on a liquid film or bearing on the disk. A suspension assembly connects the slider to a rotary or linear actuator. The suspension provides support for the slider.

The suspension must meet several requirements. The suspension must be flexible and provide a bias force in the vertical direction. This is necessary to provide a compensating force to the lifting force of the air bearing in order to keep the slider at the correct height above the disk. Also, vertical flexibility is needed to allow the slider to be loaded and unloaded away from the disk. Another requirement of the suspension is that it must provide a pivotal connection for the slider. Irregularities in operation may result in misalignment of the slider. The slider is able to compensate for these problems by pitching and/or rolling slightly to maintain the proper orientation necessary for the air bearing. Another requirement of the suspension is that it must be rigid in the lateral direction. This is needed to prevent the head from moving from side to side, which will result in the head reading the wrong track.

Disk drives have become smaller in size, and the recording track density has increased dramatically. This has necessitated the use of smaller and smaller heads and suspensions. The smaller size makes it more difficult to string individual wires along the suspension to the head. Recently, electrical leads (also known as conductors or lines) have been integrally formed directly into the suspension, by etching or deposition, in order to do away with the need to string separate wires. The electrical leads overlay a thin insulating layer which in turn overlays a metal support layer.

These etched leads are an integral part of the metal suspension body. The metal suspension can have a varying distance to the other metal parts of the arm assembly. For example, an IBM Ultrastar disk drive first publicly disclosed in September, 1998 has electrical leads which run along the suspension body, then veer outside and run along the outside periphery of the arm body. Electrical leads are fastened to the arm at a tab extension from the arm by means of a non-conductive adhesive. The metal support layer below the electrical leads is not continuous and has at least one gap section over the run of the electrical leads. The resulting suspension has a wide variance in distance between the electrical leads, metal support layer, suspension body, and arm along the run of the electrical leads. This distance variation will cause the electrical leads to be subject to signal interference and reduce the read signal bandwidth frequency.

This interference and bandwidth problem becomes greater as the data rates increase in frequency. There is a need for a suspension which solves these problems.

SUMMARY OF THE INVENTION

Briefly, in a preferred embodiment of the present invention, a suspension system comprises an actuator arm, a suspension and a transducer head. This suspension system is comprised of a load beam and a laminated member. The laminated member is comprised of three layers: a metal support layer, an electrically insulating layer, and an electrically conducting layer.

The electrically conducting layer is etched to form electrical leads which run from the transducer head, along the suspension and arm, where the electrical leads are electrically connected to the rest of the electronics of the disk drive. The metal support layer is formed in a continuous conductive plane which underlies the electrical leads, and the separating insulating layer, for the length of their run. The electrical leads are routed inside the edge of the arm. The conductive plane is connected to the actuator arm by a frequency dependent shunt. This effectively provides a ground return through the conductive plane and controls and reduces the distance to the other metal parts. The result is a suspension which can support signals with reduced interference and at higher data rates (bandwidth).

For a fuller understanding of the nature and advantages of the present invention, reference should be made to the following detailed description taken in conjunction with the accompanying drawings.

DESCRIPTION OF THE PREFERRED EMBODIMENTS

Figure 1:
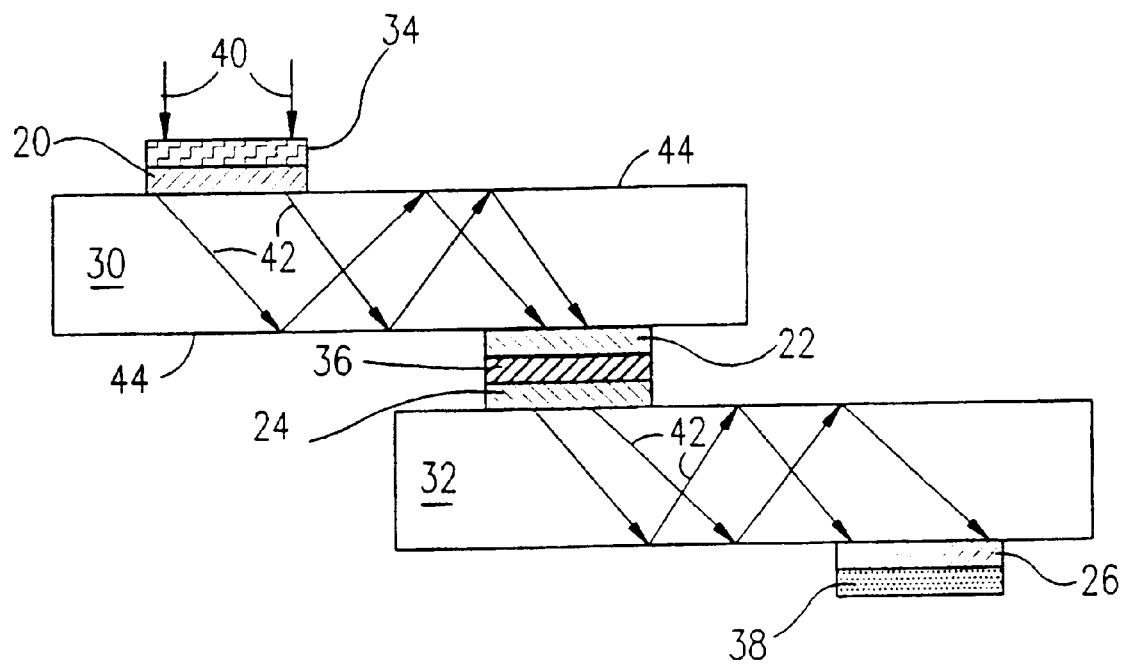
FIG. 1 is a schematic diagram of a data storage system of the present invention.
Figure 2:
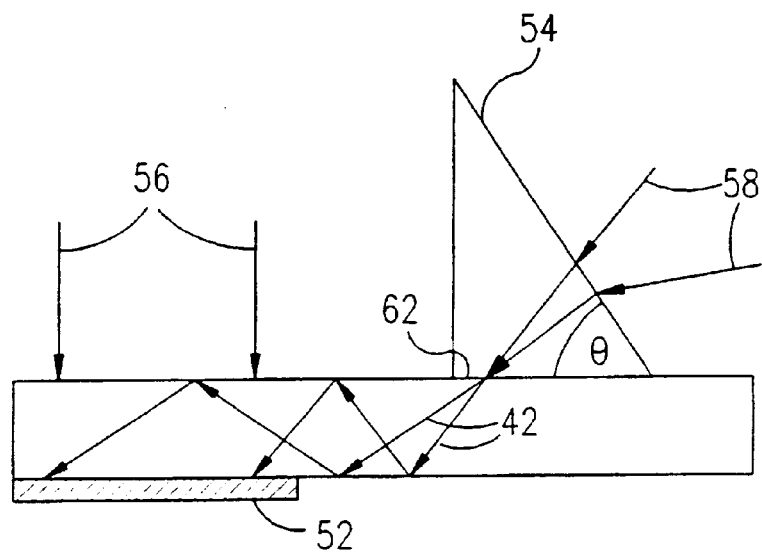
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly 20.

A plurality of transducer assemblies or heads 30 are positioned over the disks 12 such that each surface of the disks 12 has a corresponding head 30. The head 30 is comprised of an air bearing slider and read and write transducer elements. Each head 30 is attached to one of a plurality of suspensions 32 which in turn are attached to a plurality of actuator arms 34. Arms 34 are connected to a rotary actuator 36. In a preferred embodiment, the arms 34 are an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The heads 30, suspensions 32, arms 34, and actuator 36 comprise an actuator assembly 46. The disk stack assembly 20 and the actuator assembly 46 are sealed in an enclosure 48 (shown by a dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 60 may send digital data to controller 50 to be stored on disks 12, or may request the digital data be read from disks 12 and sent to the system 70. The basic operation of DASD units is well known in the art.

Figure 3:
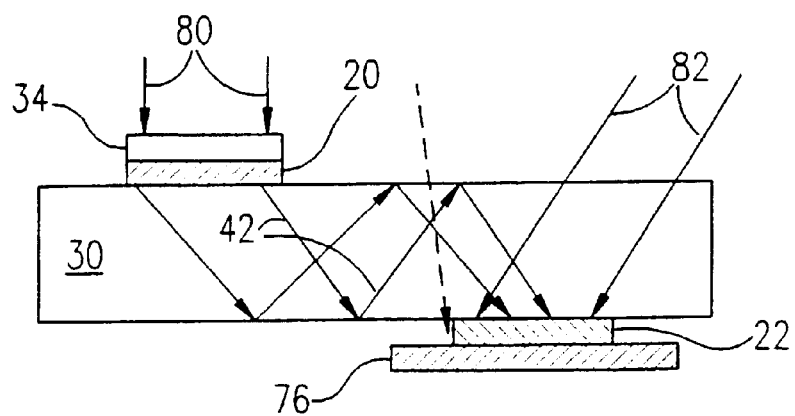
FIG. 3 is a detailed top view of the suspension system of FIG. 1.

FIG. 3 shows a top view of a head 30, suspension 32 and actuator arm 34. The combination of these elements shall be referred to as a suspension/arm assembly 90. The suspension/arm assembly 90 typically has a second suspension 32 (not shown) on its bottom surface. The suspension 32 and arm 34 have a longitudinal axis 100, a lateral axis 102 and a vertical axis 104. Suspension 32 is comprised of a load beam 110 and a laminated member 112. Laminated member 112 is formed from a multi-layer laminated material comprised of a steel support layer and electrically insulating layer, and an electrically conducting layer. The various layers of the laminated member 112 are etched away in a photolithographic process to form the desired shapes. Alternatively, the layers could be built up in a deposition process.

The laminated member 112 is attached to the load beam 110. The load beam 110 is attached to a swage member 114. Welding or adhesive may be used as the means of attachment. The swage member 114 is then swaged to the arm 34.

The suspension 32 is extremely small. The distance from the end of the actuator arm 34 to the end of the suspension is typically on the order of 15 mm. The head 30 typically measures 1.25 mm×1.00 mm×0.3 mm.

The electrically conducting layers and electrically insulating layers are etched to form electrical lines (or leads) 120 which run from a rear termination pad area located on a connection card 122 to the head 30. The connection card 122 is mounted vertically against the side of the arm 34. The electrical lines 120 are bent vertically at a section 124 to meet with the card 122. The electrical lines 120 terminate and are electrically attached to the head 30 at head termination pads which are located on the head 30.

A frequency dependent shunt 130 is located beneath lines 120 on arm 34, and this will be discussed in more detail later.

The support layer of the laminated member 112 is formed into a flexure member 142 at the end of the suspension 32. Flexure member 142 provides a gimbal mount for attachment of the head 30. The gimbal mount allows the head 30 to pivot in order to adjust its orientation (static attitude) to achieve the proper air bearing between the head 30 and disk 12 while the disk 12 is rotating. The flexure 142, and load beam 110 also serves the purpose of providing support for the electrical lines 120, among other purposes such as providing stiffness, balance and an area for bonding or welding.

Figure 4:
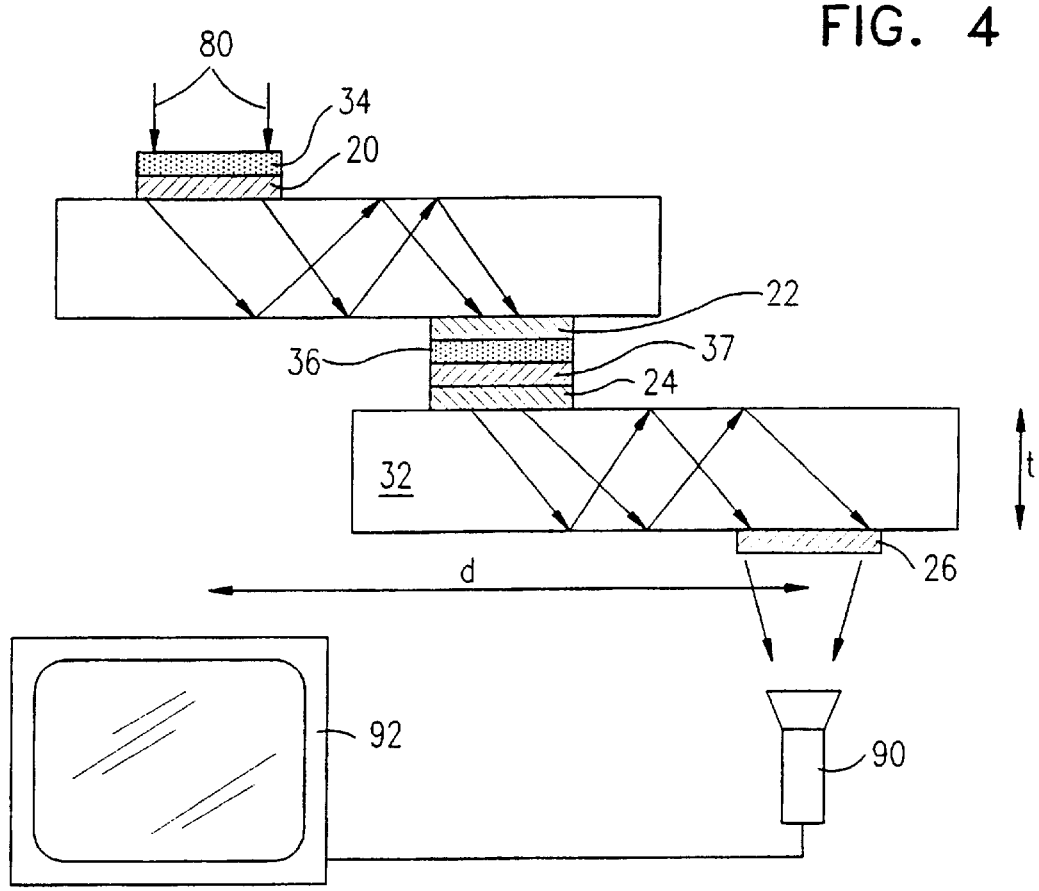
FIG. 4 shows a top view of the various elements of the suspension.

FIG. 4 shows a plan layout top view of each of the separate elements of the suspension/arm assembly 90 of FIG. 3. The head 30 has been omitted in this figure. Laminated member 112 is comprised of an electrically conducting layer 150 and electrically insulating layer 152 and a support layer 154. Layers 150, 152 and 154 are layers formed from a single laminated sheet of material. In FIG. 4 each of the layers has been separated in order to better view each of their features. However, the three layers 150, 152 and 154 are actually integrally formed together. The member 112 is formed from the integral laminated sheet by using photolitographic etch processes as are known in the art.

Layer 150 is made of an electrically conducting material such as copper or a copper alloy. In a preferred embodiment, the material is C7025 copper alloy and has a thickness of between 0.012 mm and 0.025 mm and preferably 0.018 mm.

Layer 152 is made of an electrically insulating material and in the preferred embodiment is made of polyimide or Teflon. The layer has a thickness of between 0.01 mm and 0.025 mm and preferably 0.018 mm.

Layer 154 is made of a thin stiff electrically conducting material which is able to bend slightly, and in the preferred embodiment is made of 300 series stainless steel. The thickness of this layer is between 0.012 mm and 0.025 mm and preferably 0.020 mm.

The electrical lines 120 of layer 150 are formed into four separate lines 160 of two sets (or pairs) of two lines each. In the drawing of FIG. 4 the four separate lines 160 are not distinguishable, and only the two sets of lines are viewable. The lines 120 start at the connection card 122. Connection card 122 provides connection to the read/write channel 58. The connection card 122 is located on the side of the actuator arm 34 when the drive is fully assembled. The lines 120 run in a vertical plane along the side of the arm 34 in a section 124. The lines 120 are then bent upward and run along the top surface of the arm 34 or are bent downward and run along the bottom surface of arm 34 depending upon which side of the arm 34 the suspension is mounted. Lines 120 run towards the center longitudinal axis 100 of the suspension 32. Lines 120 then run in a generally longitudinal direction towards the head 30.

At the distal end of suspension 32, the two sets of lines 120 separate and run along either side of head 30, then turn backward to the head 30 to terminate at the front face of head 30 at the head termination pads. This is necessary because the transducer elements are located on the front face of the slider. This face of the slider is the trailing face as the disk rotates beneath the suspension during operation. Lines 120 are bent 90° vertically in order to interface with the pads on the head 30.

Layer 152 is shaped to provide an electrical insulation barrier to the lines 120 of layer 150 which directly overlay the layer 152. Layer 152 forms an insulating strip directly beneath the lines 120 of layer 150. At the head area, layer 152 is shaped into a series of pads 170 which underlie lines 120. This is done to allow the lines 120 to be more flexible at the head area in order to minimize the change in static attitude of the head caused by the exertion of force by the lines 120 and to accommodate different temperature and humidity conditions.

Layer 154 provides physical support for the lines 120. At its distal end, Layer 154 forms the flexure member 142.

Flexure 142 has a distal end 226 having a front platform 228 which provides support for lines 120. Behind platform 228 is a flexure aperture 230. A tongue section 232 provides support and an attachment point for head 30. Between tongue section 232 and platform 228 are a pair of rectangular apertures 234. Apertures 234 allow the lines 120 to bend as they approach the termination pads of head 30.

Layer 154 also acts as a conductive plane 156. The conductive plane 156 is made of an electrically conducting material and runs directly beneath the electrical lines 120 separated from them by insulating layer 152. The conductive plane 156 runs below the electrical lines 120 in a continuous and interrupted run from the section 124, proximate the electrical connection card 122, to the flexure 142, proximate head 30.

Load beam 110 is generally flat and rigid and made of a stainless steel or other rigid material. In a preferred embodiment, the load beam 110 is made of 300 series stainless steel and has a thickness of between 0.025 mm and 0.100 mm and preferably 0.051 mm. It is desirable to maintain the weight and inertia of load beam as small as possible without compromising its structural rigidity.

Load beam 110 has a depressed section 250 which is used to provide additional structural stiffness. Section 250 has a pair of apertures 252 which are used for tool alignment during the manufacturing process. Another aperture 253 is used to form a spring section for the load beam 110.

Load beam 110 has a distal end with a tab 254 which is used for merge and dynamic loading and unloading of the suspension. An aperture 256 is located behind tab 254. A tongue section 258 extends into aperture 256. A stamped raised button or dimple 260 is located on tongue 258. Dimple 260 contacts tongue section 232 of flexure 142 and allows head 30 (located below tongue section 32) to gimbal (pitch and roll) slightly such that it is able to maintain the proper air bearing orientation. Load beam 110 is also formed by photolitographic process and the raised features are stamped. Laminated member 112 and the load beam 110 are attached by welding. Head 30 is attached to flexure tongue 232 by adhesive.

Swage plate 114 is made of stainless steel and has a thickness of between 0.100 mm and 0.200 mm and preferably 0.178 mm. Swage plate 114 has a swage spud 270 which is a raised cylindrical flange containing a cylindrical aperture.

Arm 34 is made of a rigid, electrically conducting material such as stainless steel or aluminum and has a thickness of between 0.8 mm and 1.0 mm and preferably 0.9 mm. Arm 34 has a distal end 272 which has an aperture 274 for receiving the spud 270 of swage plate 114.

The construction of the suspension/arm assembly 102 may now be understood. Laminated member 112 is formed from the three layer laminated material. The laminated member 112 is then welded to load beam 110. The load beam 110 is then welded to swage plate 114. The head 30 is then attached to flexure 142 and the leads 120 are bonded to the head pads. The swage spud 270 of swage plate 114 is placed in aperture 274 of arm 34 and swaged into place.

Figure 5A:
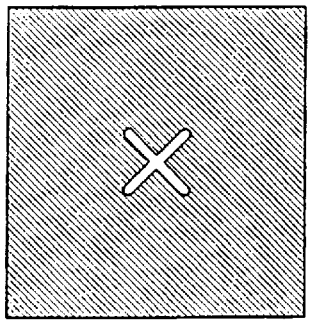
FIG. 5 shows a cross sectional view of the frequency dependent shunt of FIG. 3.
Figure 5B:
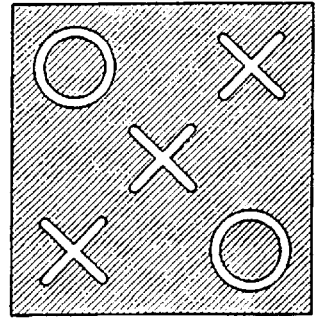

FIG. 5 shows a cross sectional view of the frequency dependent shunt 130 of FIG. 3. The shunt 130 comprises the laminated member 112 with conducting layer 150, insulating layer 152 and support layer 154. The support layer functions as continuous conductive plane 156 beneath the electrical lines 120. The conductive plane 156 is attached to arm 34 by means of an adhesive layer 302. The adhesive layer 302 may be made of a dielectric adhesive such as Loctite LI504 with Primer N or an electrically conducting adhesive such as Loctite LI504 with Primer N impregnated with silver particles.

At the location of shunt 130, the support layer 154 has an extension section 310 which extends beyond the outer edge of arm 34. Extension 310 provides an adhesive trap. During manufacture, the adhesive 302 may be placed in a corner of 312 formed between extension 310 and arm 34. The adhesive stays in place while it wicks through capillary effect into the space between the support layer 154 and arm 34.

The conductive plane 156, adhesive 302 and arm 34 form a frequency dependent shunt 130 to reduce the impedance between plane 156 and arm 34. Arm 34 is in turn electrically grounded through the actuator 36. The conductive plane 156 and arm 34 effectively form two plates of a capacitor that are separated by the thickness of the adhesive 302. Adhesive 302 therefore acts as the capacitor's dielectric. The impedance magnitude between the two plates of the capacitor is approximated by the formula:

$$|Z|=t/sqrt((Aew)^2+(AK)^2)$$

where Z=impedance, t=adhesive thickness, A=area of contact, w=signal frequency in radians/second, k=conductivity constant of the adhesive and e=dielectric constant of the adhesive. From this equation, it can be seen that for high recording frequencies (i.e high data rates), Z approaches zero. Z also approaches zero as t approaches zero and A becomes large.

In effect the conductive plane 156 is effectively grounded to the arm. It can be seen that the effectiveness of the ground can be improved by making the contact area A as large as possible, reducing the adhesive thickness t, increasing the conductivity K, or increasing the dielectric constant e.

Figure 6:
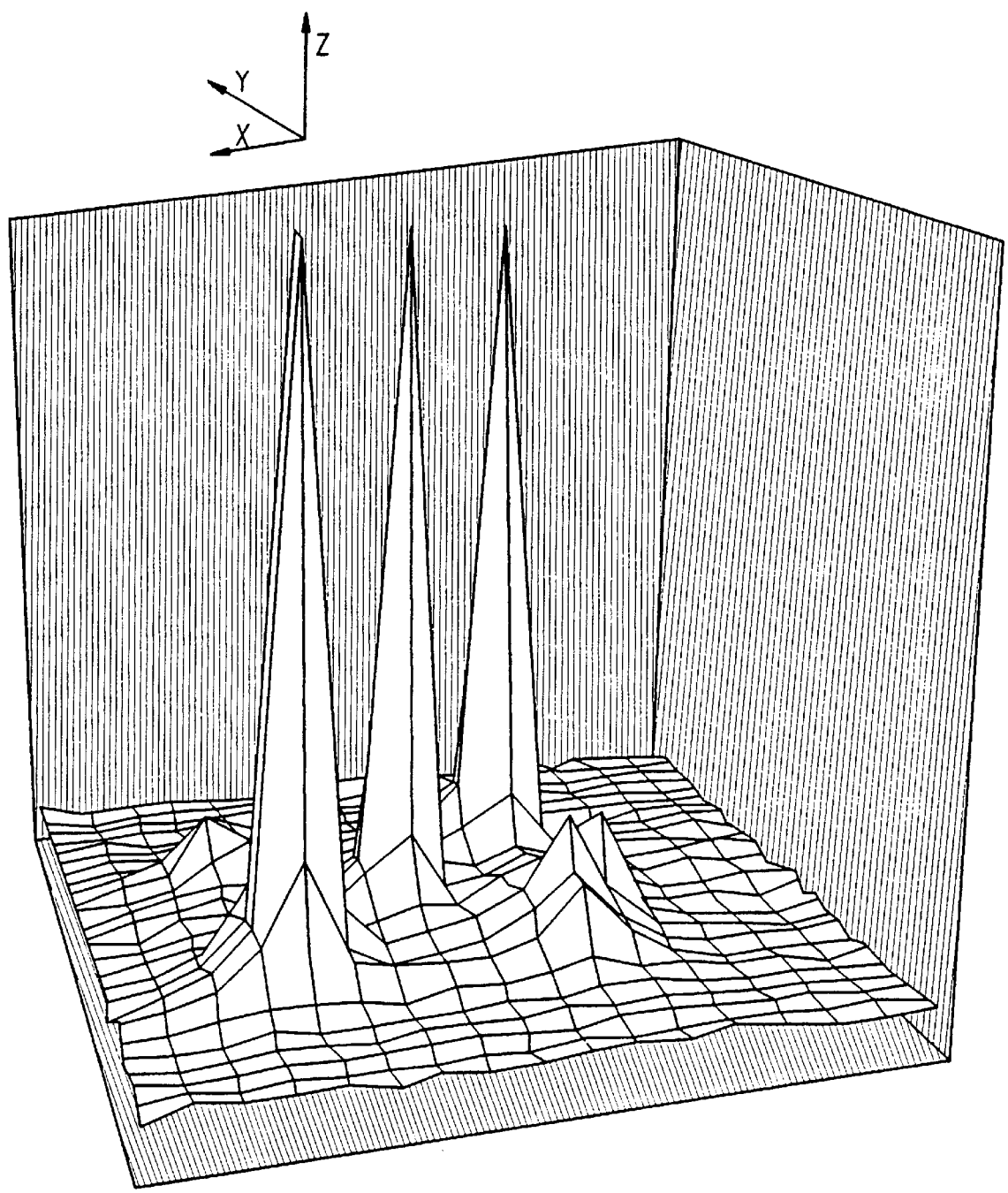
FIG. 6 shows a side view of the suspension system of FIG. 3.

FIG. 6 shows a side view of a portion of the suspension/arm assembly 90. The shunt 130 is shown. The laminated member 112, containing the electrical lines 120, insulator 152 and conductive plane 156, runs from the load beam 110 back along the top of arm 34. It can be seen that the adhesive 302 of shunt 130 acts to mechanically attach the laminated member 112 to arm 34. In addition, the adhesive 302 serves the function of keeping the laminated member 112 in close proximity to arm 34. In the present case, there is a bend section 400 in laminated member 112 as laminated member 112 leaves load beam 110 and dips down to run along the top surface of arm 34. The laminated member 112 thus keeps a fairly constant and small distance between itself and the arm 34. The dimensions of FIG. 6 are exaggerated in order that they may be more easily viewed. In actuality, the thickness of load beam 110 and laminated member 112 are very small in comparison with arm 34. The space between the laminated 112 and arm 34 is approximately equal to the thickness of the adhesive 302. In the preferred embodiment, the adhesive thickness (t) is between 1 µm and 10 µm and preferably 1 µm, or as small as possible. The area (A) of the adhesive is between 5 mm$^2$ and 10 mm$^2$ and preferably 10 mm$^2$, or as large as possible.

Figure 7:
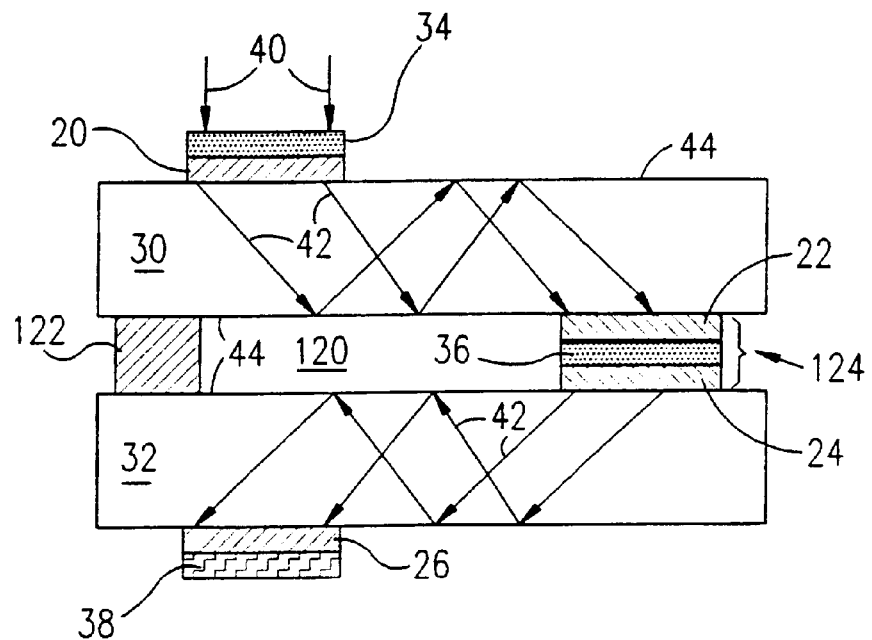
FIG. 7 shows a graph of signal magnitude versus frequency.
Figure 8:
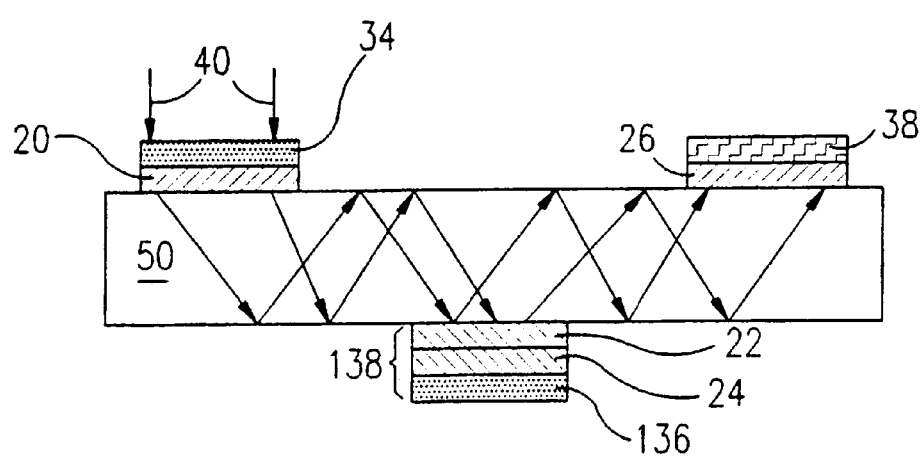

FIG. 7 shows a graph of the signal transfer versus frequency. These tests were conducted using the suspension of the present invention with and without the frequency dependent shunt. The results show a 72% increase in the three dB bandwidth frequency with the shunt 130 in place. This is a very significant improvement in performance. The suspension of the present invention thus allows for the higher data rates required of the present data storage products. In addition to increasingly bandwidth frequency, the space between plane 156 and arm 34 is reduced. This space reduction lowers interference susceptibility of the electrical leads 120.

While the preferred embodiments of the present invention have been illustrated in detail, it should be apparent that modifications and adaptations to those embodiments may occur to one skilled in the art without departing from the scope of the present invention as set forth in the following claims.

We claim:

1. A transducer suspension system comprising:

an electrically conducting actuator arm;

a suspension comprising a load beam and a laminated member, the laminated member comprising an electrically conducting layer, an electrically insulating layer, and a electrically conducting support layer, the electrical conducting layer comprising electrical leads running from a distal end of the suspension to the arm, the support layer forming a continuous conductive plane beneath the electrical leads; and a frequency dependent shunt located between the conductive plane and the arm.

2. The system of claim 1, wherein the shunt is capacitive.

3. The system of claim 1, wherein the shunt is an electrical connection.

4. The system of claim 1, wherein the shunt comprises an adhesive area located between the ground plane and the arm.

5. A transducer suspension system comprising:

an electrically conducting actuator arm;

a suspension comprising a load beam and a laminated member, the laminated member comprising an electrically conducting layer, an electrically insulating layer, and a electrically conducting support layer, the electrical conducting layer comprising electrical leads running from a distal end of the suspension to the arm, the support layer forming a continuous conductive plane beneath the electrical leads;

a frequency dependent shunt located between the conductive plane and the arm;

a transducer element attached to the suspension;

a recording media located proximate to the transducer element;

a media movement device for moving the media;

an arm movement device for moving the arm; and an electrical device connected to the transducer element for reading data from the media.

6. The system of claim 5, wherein the shunt is capacitive.

7. The system of claim 5, wherein the shunt is an electrical connection.

8. The system of claim 5, wherein the shunt comprises an adhesive area located between the ground plane and the arm.

* * * * *